H. H. FULLER.
TUBE-CUTTER.

No. 185,314. Patented Dec. 12, 1876.

Witnesses
Albert M. Fuller
Henry Saiger

Inventor
Hiram Holcomb Fuller

UNITED STATES PATENT OFFICE.

HIRAM H. FULLER, OF MEADVILLE, PENNSYLVANIA.

IMPROVEMENT IN TUBE-CUTTERS.

Specification forming part of Letters Patent No. 185,314, dated December 12, 1876; application filed April 24, 1876.

*To all whom it may concern:*

Be it known that I, HIRAM H. FULLER, of Meadville, in the county of Crawford and State of Pennsylvania, have invented a new and useful Tube-Cutting Machine, said machine being fully described in the following specification, reference being had to the accompanying drawings.

The object of my invention is to cut off the tubes in tubular boilers near their ends, thereby admitting of their removal for the purpose of cleaning them from scale, or for necessary repairs.

The manner of operating the machine is as follows: It is first thrust into the tube to be cut off. The shaft A is then turned by means of the hand-wheel G. The collars D and D' are thereby caused to approach each other, D' having an internal thread, and forming, as it were, a nut on end of shaft A. The collars D and D', as they approach, force outward the arms C C until they touch the inner surface of the tube, thereby rigidly securing the machine.

Figure 1:
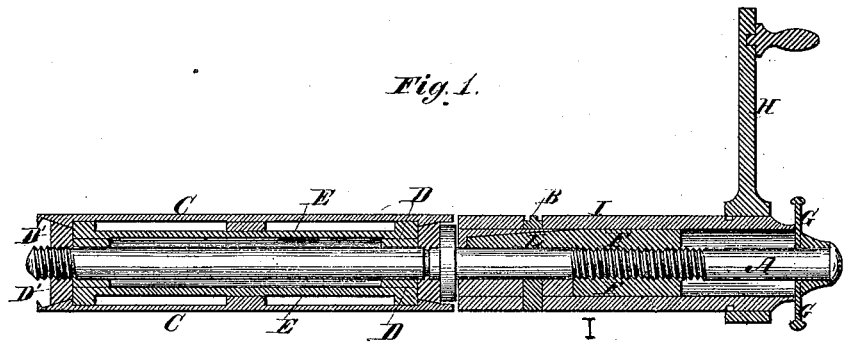
Figure 2:
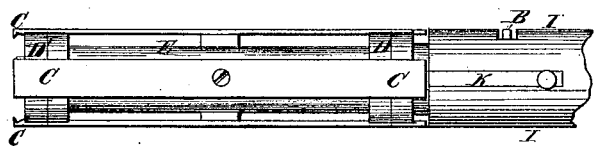
Figure 3:

The sleeve E is furnished with three or more of the expanding arms C C. To prevent the sleeve E and collars D and D' from turning with shaft A, a key, K, Fig. 2, is moved out, engaging one of the arms C, and subsequently withdrawn when the machine is secured in the tube. I I, revolving on shaft A, is then turned by means of the handle H. This handle is fitted with a ratchet, in order to cut off the tubes near the shell of the boiler, where it is impossible to make a complete revolution. F is a sleeve fitting into and turning with I, and is provided with an inclined key, L, extending from it, and passing through cutting-tool B. In the bore of sleeve F, for a short distance, is cut an internal thread, fitting into an external thread on shaft A. As I I revolves, carrying with it sleeve F, the sleeve F is driven forward by the screw on shaft A, and, by means of the inclined key L, gradually forces outward the cutting-tool B until the tube is entirely cut off. In the side of key L an inclined groove is cut, into which a projection from tool B fits, Fig. 3, thereby enabling key L, as it is drawn back, to depress the tool B.

What I claim as my invention is—

The combination of the sleeve I, tool B, ratchet-lever H, and the key K with the sleeve E, collars D D', expanding arms C C, the shaft A, and the screw-sleeve F, with inclined key L, all constructed substantially as and for the purposes herein set forth.

HIRAM HOLCOMB FULLER.

Witnesses:
ALBERT M. FULLER,
HENRY SAEGER.